United States Patent [19]

Bagley

[11] Patent Number: 5,092,667

[45] Date of Patent: Mar. 3, 1992

[54] EYEGLASS RETAINER/EARS PROTECTOR

[76] Inventor: Matthew R. Bagley, 1174 E. Silversmith Dr., Sandy, Utah 84094

[21] Appl. No.: 565,926

[22] Filed: Aug. 13, 1990

[51] Int. Cl.⁵ .............................................. G02C 3/00
[52] U.S. Cl. .................................. 351/156; 351/157; 351/123
[58] Field of Search ............... 351/156, 157, 158, 123; 2/10, 11

[56] References Cited

U.S. PATENT DOCUMENTS

| | | | |
|---|---|---|---|
| 4,133,604 | 1/1979 | Fuller | 351/156 |
| 4,657,364 | 4/1987 | Murrell | 351/156 |

Primary Examiner—Paul M. Dzierzynski
Attorney, Agent, or Firm—Mallinckrodt & Mallinckrodt

[57] ABSTRACT

An eyeglass retainer, which also provides protection for the ears, comprising an adjustable two-piece headband having tubular members for receiving and holding the temples of a pair of eyeglasses threaded therethrough, and wherein the tubular members hook over the user's ears when the eyeglass retainer is emplaced in operable position on a user's head, and wherein the eyeglasses are firmly retained in position due to the tubular members being snugly emplaced between the headband pieces and the user's head.

18 Claims, 1 Drawing Sheet

EYEGLASS RETAINER/EARS PROTECTOR

BACKGROUND OF THE INVENTION

1. Field

The invention is in the field of eyeglass retainers.

2. State of the Art

Various devices have been produced in the prior art devised to firmly retain eyeglasses in place on the head of a user when placed in operable position. A need for such is particularly important when the user is engaged in a sport such as skiing. U.S. Pat. No. 4,133,604 depicts a commonly used retainer which features an elastomeric head band which grips the temples of a pair of eyeglasses in a "Chinese Finger" fashion. However, neither this device, nor any others known by applicant, provide any protection for the ears, which would be particularly desirable when engaged in a sport such as skiing.

SUMMARY OF THE INVENTION

A principal objective in the making of the invention was to provide a simple inexpensive device which would serve the dual function of retaining a pair of eyeglasses on the head of a user in operable position, and in addition protect the ears of the user, particularly against cold air.

The invention comprises an elastomeric head band adapted to encircle the head of a user and to retain the temples (bow pieces) of a pair of eyeglasses while also providing a pair of earmuffs to protect the ears of the user.

The elastomeric headband comprises two separable headband pieces shaped roughly like tear drops, which have cooperative Velcro fasteners at their respective elongate ends. The Velcro fasteners enable the user to adjust the length of the headband so as to fit his or her head. Each headband piece is also wide enough and appropriately shaped, at an appropriate location, so as to substantially cover the respective ears of a user when the headband is in place in operable position. Each headband piece also incorporates a tubular member, attached near the blunt end of the headband piece, which is fashioned so as to snugly grasp a corresponding temple of the eyeglasses when threaded therethrough. A hole is also formed in each headband piece which is aligned with its respective tubular member at its point of attachment.

The tubular members are devised and emplaced so as to be positioned between the headband pieces and the head of a user, and also to hook over the ears of the user, when a pair of eyeglasses is assembled to the headband and the whole is emplaced on the head of a user in operable position.

The headband pieces are preferably fashioned from a suitable elastomeric material. At least one such material comprises a sandwich having a neoprene core with a mylar fabric on one side and a terry cloth fabric on the opposite side. The tubular members are also preferably fashioned from a sandwich material, having a neoprene core with a mylar fabric on each side. Preferably the headband pieces are devised so as to have the terry cloth fabric on the inside of the band, thus being adjacent to the head of the user, and the mylar fabric on the outside.

THE DRAWINGS

In the drawings:

FIG. 1 is a perspective view of the eyeglass retainer having a pair of eyeglasses assembled thereto;

FIG. 2, a front view of the two-piece hadband showing the two separable elongate headband pieces fastened together and the tubular members attached thereto;

FIG. 3, a top view of the eyeglass retainer corresponding to FIG. 1;

FIG. 4, a partial view showing a temple of a pair of eyeglasses in engagement with a tubular member; and FIG. 5, a view of a tubular member not yet attached to a headband piece.

DETAILED DESCRIPTION OF THE ILLUSTRATED EMBODIMENT

Figure 1:
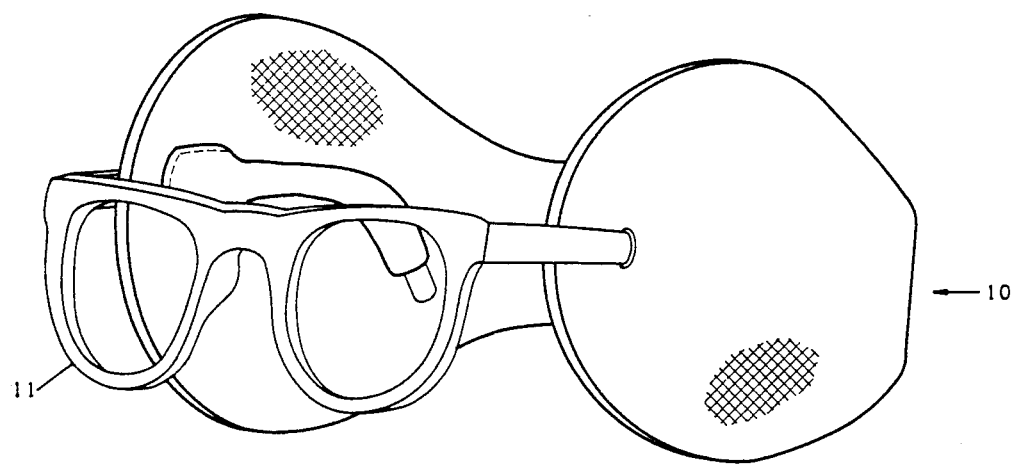
Figure 2:
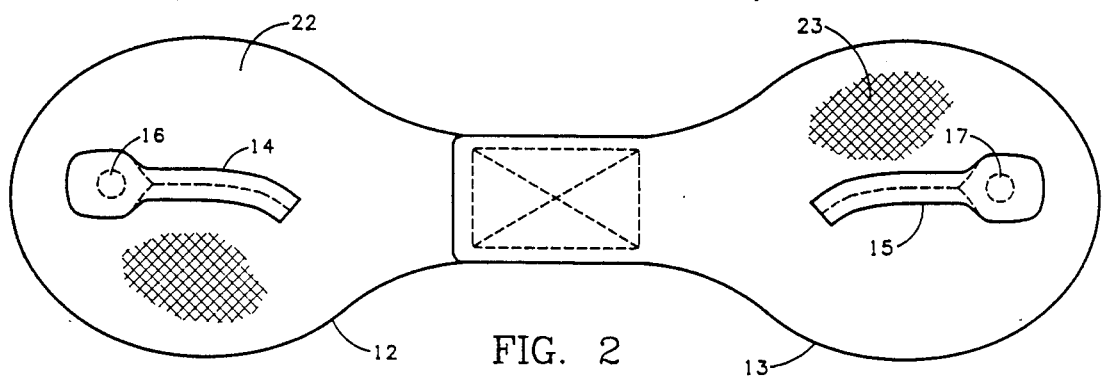
Figures 3, 4, 5:
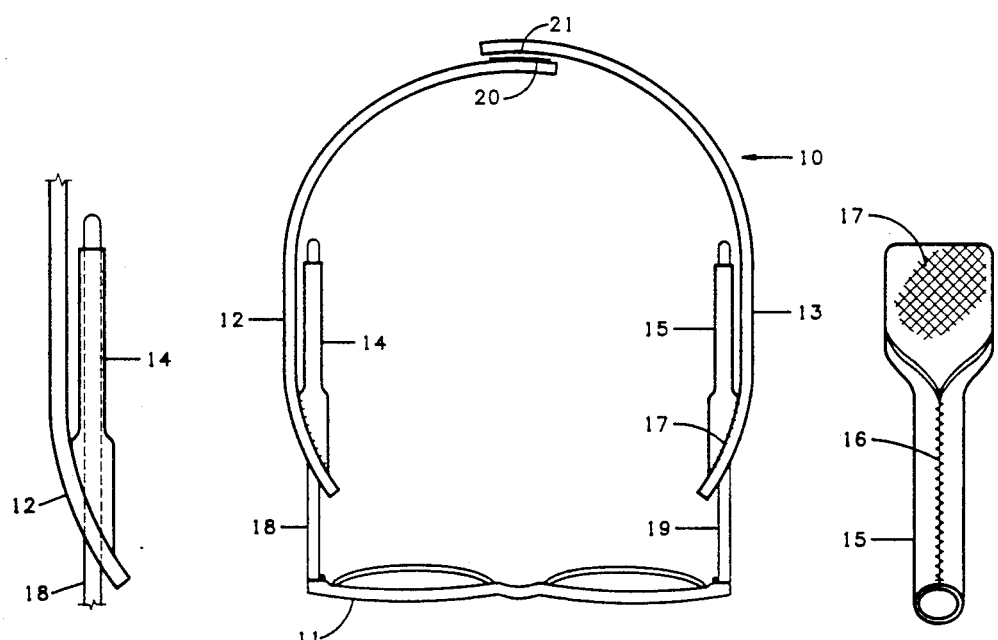

The eyeglass retainer 10 is shown in FIGS. 1 and 3 with a pair of eyeglasses 11 assembled thereto. The eyeglass retainer comprises a two-piece headband, which in turn comprises a pair of separable elongate headband pieces, 12 and 13, and a pair of tubular members, 14 and 15, attached respectively thereto. Tubular members 14 and 15 are aligned with respective holes 16 and 17 passing through headband pieces 12 and 13. Each tubular member is fashioned from a flat strip, rolled along most of its length with its edges stitched together with stitching 16 as shown in FIG. 5. The unrolled end 17 of tubular member 15 is attached to headband piece 13 by stitching 17, as shown in FIG. 3. Tubular member 14 is attached to headband piece 12 in a similar manner. Tubular members 14 and 15 are configured and sized so as to snugly receive and grasp corresponding temples 18 and 19 of eyeglasses 11, all as shown in FIGS. 3 and 4. Headband piece 12 has a Velcro panel 20 attached to its outside surface near one end and headband piece 13 has a cooperative Velcro panel 21 attached to its inside surface, as shown in FIG. 3.

Headband pieces 12 and 13 have respective enlarged width portions 22 and 23 positioned so as to substantially cover the ears of a user when the eyeglass retainer is emplaced around the head of a user in operational position.

Headband pieces 12 and 13 are preferably fashioned from an elastomeric sandwich material having a neoprene core with a layer of terry cloth fabric on its inner surface and a layer of mylar fabric on its outer surface. However other materials may be used, such as rubber for the core and nylon, silk, cotton, or wool fabric for the outer layers.

Tubular members 14 and 15 are preferably fashioned from an elastomeric sandwich material having a neoprene core with mylar fabric on both its surfaces. However, other materials may be used as for the headband pieces.

Usage of the eyeglass retainer proceeds as follows:

A user assembles eyeglasses 11 to eyeglass retainer 10 by first passing temples 18 and 19 through holes 16 and 17 in respective headband pieces 12 and 13, and then threading them into tubular members 14 and 15. The user then emplaces the eyeglasses on his head in the usual operable position with tubular members 14 and 15, which contain temples 18 and 19, hooked over his ears. The user then draws the headband pieces snugly together in back of his head and fastens Velcro members 20 and 21 together. Portions 22 and 23 of headband pieces 12 and 13 will now cover and protect the user's ears.

It has been found that eyeglasses 11 will remain securely assembled to headband pieces 12 and 13, partially due to snugness of fit of temples 18 and 19 in tubular members 14 and 15, and partially due to headband pieces 12 and 13 pressing against the tubular members, which in turn press against the user's head.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim as my invention:

1. An eyeglass retainer, comprising an elastomeric headband fashioned from two separate elongate elastomeric headband pieces, said headband being devised to partially encircle the head of a user in operable position by passing closely around the back and sides of said user's head; said headband pieces having respective portions which substantially cover the ears of said user when said headband is in said operable position; said headband pieces also having respective cooperative fastening means attached at or near one end; each of said headband pieces also having a hole near its opposite end sized so so permit a temple of a pair of eyeglasses to pass therethrough; and each of said headband pieces having a tubular member attached thereto, aligned with said hole, and fashioned and sized so as to snugly accept and grasp a corresponding temple of said pair of eyeglasses when threaded therethrough.

2. An eyeglass retainer according to claim 1 wherein the tubular members are devised and emplaced with respect to said headband pieces so as to hook over the ears of a user when said eyeglass retainer has a pair of eyeglasses assembled thereto and the whole is emplaced so as to encircle the head of a user in operable position.

3. An eyeglass retainer according to claim 1 wherein the tubular members are emplaced with respect to the headband pieces so as to lie between said headband pieces and the head of the user when said eyeglass retainer is emplaced around the user's head in operable position.

4. An eyeglass retainer according to claim 1 wherein the cooperative fastening means comprises means for adjustably fastening the two separable headband pieces together thus enabling a user to lengthen or shorten the headband in order to accomodate his or her particular head size.

5. An eyeglass retainer according to claim 4 wherein the cooperative fastening means comprises cooperating Velcro panels.

6. An eyeglass retainer according to claim 1 wherein the tubular members are attached to the inside surfaces of the headband pieces, the inside surfaces being the surfaces adjacent to a user's head when said eyeglass retainer in emplaced in operable position.

7. An eyeglass retainer according to claim 1 wherein each elastomeric headband is fashioned as a sandwich from a material having an elastomeric core and a fabric on each side of said core.

8. An eyeglass retainer according to claim 7 wherein the core is fashioned from neoprene.

9. An eyeglass retainer according to claim 7 wherein the core is fashioned from rubber.

10. An eyeglass retainer according to claim 7 wherein the fabric on at least one side is mylar.

11. An eyeglass retainer according to claim 7 wherein the fabric on at least-one side is terry cloth.

12. An eyeglass retainer according to claim 7 wherein the fabric on at least one side is nylon.

13. An eyeglass retainer according to claim 1 wherein each tubular member is fashioned from a sandwich material having an elastomeric core and a fabric on each side of said core.

14. An eyeglass retainer according to claim 13 wherein the core is fashioned from neoprene.

15. An eyeglass retainer according to claim 13 wehrein the core is fashioned from rubber.

16. An eyeglass retainer according to claim 13 wherein the fabric on at least one side is mylar.

17. An eyeglass retainer according to claim 13 wherein the fabric on at least one side is terry cloth.

18. An eyeglass retainer according to claim 13 wherein the fabric on at least one side is nylon.

* * * * *